Feb. 19, 1935.  H. K. NOPOLA ET AL  1,991,864
INTONATION DETECTOR
Filed Dec. 29, 1932

MARTIN M. JARVINEN.
HJALMAR K. NOPOLA.
INVENTORS
BY Arthur M. Smith
ATTORNEY

Patented Feb. 19, 1935

1,991,864

UNITED STATES PATENT OFFICE 1,991,864

INTONATION DETECTOR

Hjalmar K. Nopola, Detroit, and Martin M. Jarvinen, Grand Rapids, Mich.

Application December 29, 1932, Serial No. 649,370

5 Claims. (Cl. 84—477)

Our invention relates to an intonation detector and more particularly to such a detector adapted for use with stringed musical instruments in which a tone is produced by the vibration of the strings. For the purposes of this application the invention will be discussed as applied to stringed musical instruments in which the vibrations in the strings are produced by the use of a bow resulting in a sustained vibration in the strings, a violin, viola, violoncello and bass viol being the best known instruments in this general class of instruments to which our invention may be applied.

An intonation detector embodying our invention differs from intonation detectors heretofore known and used in that it is constructed in accordance with the true scale and when used in connection with the instrument to which it is applied indicates the precise point upon which the finger of the player should be placed to produce tones of the scale based upon just intonation on which pure harmony in music is based.

By the use of such an intonation detector it is possible for a student of the violin, for example, to produce the true tones of the natural scale and in so doing to train the ear to distinguish such tones at the same time that the fingers are being trained for the proper positions on the keyboard to produce such tones.

It has been found that in playing a violin the tones of the tempered scale will not always produce the harmony which may be produced if the violin is played in accordance with the true scale. This is particularly noticeable in stringed trios and quartettes, as well as in the entire field of chamber music. We have found that if such instruments are played in accordance with the true scale that many of the discords discernible to the trained ear may be definitely avoided.

For the purposes of comparison it is to be observed that whereas the tempered scale consists of twelve intervals to the octave, the true scale consists of a much larger number of intervals based upon mathematical calculation which will carry the number of such intervals to a point approaching infinity.

While it is not practical to attempt to construct an intonation detector which will show all of the possible intervals in the true scale, it is possible through our invention to indicate a sufficient number of intervals in any scale to produce all variations of tones which may be detected by the trained ear.

Heretofore it has been thought to be impractical to attempt to produce more than twelve degrees to the octave based upon the tempered scale. Such methods of teaching the violin and instruments of the violin family generally cannot produce true intonation from the instrument because, when properly tuned, the open strings of such instruments play in perfect fifths. This gives rise to many of the discords which even the untrained ear may detect in the playing of certain music on the violin or instruments of the violin family. It is only through playing such instruments in accordance with the laws of natural harmony and just intonation according to the true scale that the tones produced from the open strings can be made to harmonize with tones produced from certain positions of the other strings.

It is, therefore, an object of our present invention to provide a practical intonation detector adapted for use in connection with the finger board of stringed instruments which is adapted to be used in the production of tones corresponding to the true scale.

It is a further object of our present invention to provide a method of teaching and playing stringed instruments of the violin family based upon the true scale without regard to the compromised tones of the tempered scale.

For each octave for which our intonation detector is adapted for use, the ratios of one note to another, based upon their corresponding vibration frequencies in the pure diatonic scale, are used as a measurement from which may be marked off the various indicia for various notes which may be produced in the octave to be played. This is accomplished by actual measurement of the lengths in inches calculated for each note in the table of intervals for each octave.

An intonation detector embodying our invention and constructed in accordance with the above stated principles is shown in the accompanying drawing, in which.

Figure 1:
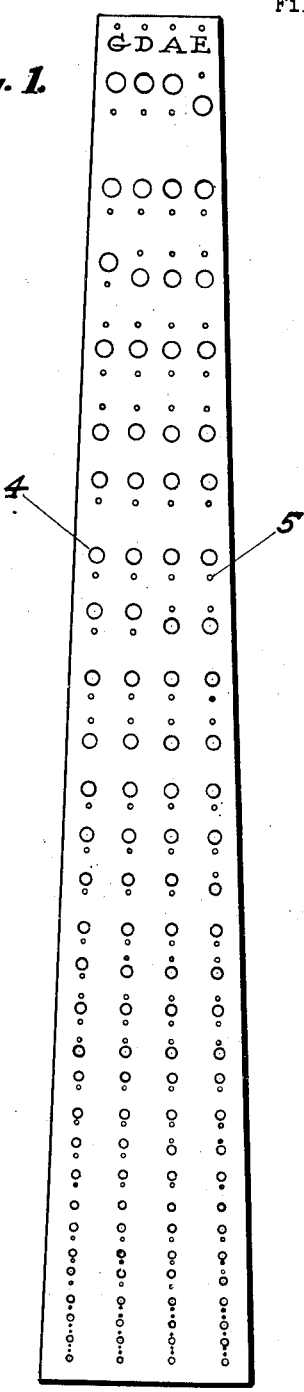
Fig. 1 is a plan view of an intonation detector embodying our invention combined with the finger board of a violin.

Referring more in detail to the drawing and particularly to Fig. 1, the intonation detector embodying our invention is divided into four longitudinally extending lines corresponding on the violin to the strings G, D, A and E and indicated by the letters G, D, A and E. On each longitudinal row is placed a plurality of marks 4 and a plurality of smaller marks 5, preferably circular in form and of a color which contrasts with the color of the background of the finger board. These marks are inserted in the surface of the finger board in such a manner as to leave it perfectly smooth. Each mark is measured exactly as to its size and the spaces between the marks likewise are measured exactly in accordance with the calculations as above described for each note to be produced on the instrument of which this finger board is a part.

The size of each of the marks 4 corresponds to the size of the comma of the particular tone, which is the measurement of the difference between the major tone and the minor tone of the diatonic scale, the ratio thus arrived at being 81/80, this ratio, when applied to the distance to be measured, giving a measurement which is taken as the diameter of the particular mark 4. Thus, as the length of the string grows shorter, the size of the mark 4 decreases as the marking approaches the point nearest the bridge of the instrument. The small marks 5 are so placed on the intonation detector at points adjacent the marks 4 to indicate the flat notes and accidentals corresponding to the note produced from the position indicated by the larger mark 4.

In each instance the minor tone is produced by placing the finger toward the lower portion of the mark 4 and the corresponding major tone is produced by placing the finger near the upper portion of the mark 4. Thus each mark 4 indicates a position in which a major and a minor tone may be produced, these tones having vibration frequencies corresponding to the values of the two whole tone intervals upon which the pure scale is based. In each instance, the size of the particular mark 4 indicates the required difference in string length to produce the minor and major tones.

As here shown, the marks are preferably kept in transverse rows to avoid possible confusion when read, it being understood, however, that the intonation detector may be used as a calculator in forming the diatonic scales of different keys. In each case the large marks 4 denominate the fundamental notes and their contemporaries of the diatonic scale, as well as the sharp notes and contemporary notes, while the flat notes and the accidentals of any such scale are marked off with the smaller marks 5.

Figure 2:
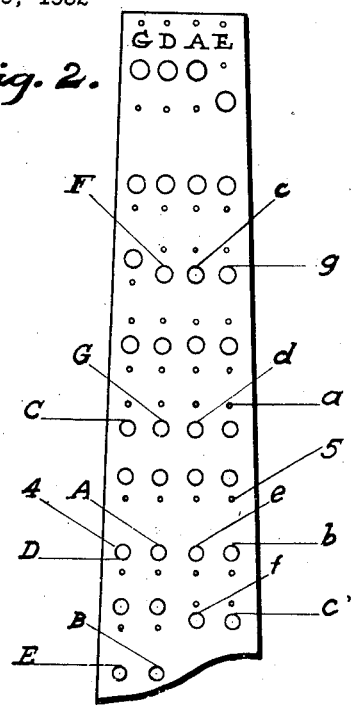
Fig. 2 is a fragmentary plan view showing a portion of the intonation detector and finger board of Fig. 1, which is lettered in accordance with the accepted notations of scales so as to show more clearly the practical utility of a device embodying our invention.
Figure 3:
Fig. 3 is a cross section of the combined intonation detector and finger board taken on the line 3—3 of Fig. 1.

As shown in Fig. 2, the intonation detector may be used as an instruction chart by assigning to certain of the marks 4 the marking corresponding to the scale to be played. As for example, two octaves of the scale of C major may be marked off in such a manner as to construct a pure diatonic scale in the key of C major. As here shown, this scale is played in the second position. The note C (having a vibration frequency of 256) is indicated at the lower end of the circular mark on the G string and is marked with the letter C, and is taken as the fundamental note. In accordance with the ratios of the pure diatonic scale, each of the notes of the scale in construction is found at the lower end of the precise mark 4, except the notes D on the G string and the note A₁ on the E string. The note D is found at the upper end of the circular mark 4 indicating the note D on the G string, and the note A₁ on the E string is found on the small circular mark 5.

The construction of chromatic scales and enharmonic divisions in accordance with just intonation, with the aid of an intonation detector embodying our invention, may be worked out through the medium of instructive charts and texts based upon the known theory of the construction of the intonation detector.

The circular marks on the intonation detector have been limited to the least sufficient number in the division of an octave to insure clearness in appearance, as well as distinction and readability in making calculations in scale construction. These marks are sufficient for all of the variations in tone which may be readily ascertained by the ear and which are practical from the standpoint of the actual mechanics of fingering the strings.

In the mechanical construction of an intonation detector embodying our invention we have found that the circular marks on the intonation detector may be made of some suitable hard substance such as celluloid, bakelite, ivory or hard wood, and inserted into the material of the finger board. The inlay may be made to any desired depth so long as the required accuracy of spacing of the marks is followed. Such construction makes the instrument durable enough to stand the wear caused by its prolonged use while yet retaining its accuracy and distinctiveness.

Various other processes may be used to place the marks used in the embodiment of our invention, such for example as moulding such marks into the finger board formed of a synthetic compound, or by printing in the form of paper charts adapted to be fastened temporarily to the finger board of the instrument.

While we have shown our invention as applied to the finger board of a violin, and while we have discussed the theory underlying its construction only in accordance with a few of the phases of its use, it will be understood by those skilled in the art that a number of changes may be made both in its construction and to the uses to which it may be put, and we desire to avail ourselves of all changes which may be made therein within the scope of the appended claims.

We claim:

1. An intonation detector adapted for use on stringed musical instruments, having a plurality of finger position indicating means adjacent each string of the instrument and extending lengthwise of such string, certain of the indicia indicating accidental and flat tones and other of said indicia indicating the position of whole tones, the whole tone indicia corresponding in size to a measurement of 1/80 the length of the string in vibration, all of said indicia being placed on said intonation detector in accordance with the principles of just intonation in such a manner that each tone produced has a fixed predetermined frequency corresponding to the frequency of the corresponding tone in a pure diatonic scale.

2. An intonation detector adapted for use on stringed musical instruments, having indicia thereon for determining the length of the string to be put in vibration to produce tones in accordance with the pure diatonic scale, certain of said indicia indicating the position to produce major and minor tones of the pure diatonic scale and corresponding in size to the measurement of the comma of the tone to be produced, and other of said indicia indicating the position to produce accidentals of said major and minor tones.

3. An intonation detector adapted for use on stringed musical instruments, having indicia thereon for determining the length of the string to be put in vibration to produce tones in accordance with the pure diatonic scale, certain of said indicia having a diameter equal to 1/80 of the length of the string in vibration and adapted to indicate the position to produce major and minor tones of the pure diatonic scale, and other of said indicia indicating the position to produce accidentals of said major and minor tones.

4. An intonation detector adapted for use on stringed musical instruments, having indicia thereon for determining the length of the string to be put in vibration to produce tones in accordance with the pure diatonic scale, certain of said indicia having a diameter of 1/80 of the length of the string in vibration at that point, and thus graduated in size and becoming smaller as the length of the string in vibration becomes shorter, and adapted to indicate positions to produce major and minor tones of the pure diatonic scale, and other of said indicia indicating the position to produce accidentals of said major and minor tones.

5. An intonation detector for stringed musical instruments including indicia placed adjacent each string of such instrument, said indicia being placed relative to the strings of such instrument in accordance with the formula $N = \frac{1}{2} LT/M$, in which N indicates the frequency of vibration necessary to produce major and minor tones in accordance with the tones of the pure diatonic scale, L indicates the length of the string in vibration, T indicates the tension of the string, and M indicates the density of the string per unit length, each of said indicia corresponding in size to 1/80 of the length of the string in vibration.

HJALMAR K. NOPOLA.
MARTIN M. JARVINEN.